(12) United States Patent
Brown et al.

(10) Patent No.: US 6,515,082 B1
(45) Date of Patent: Feb. 4, 2003

(54) PROCESS FOR PREPARING POLYMERS

(75) Inventors: Jeffrey Lewis Brown, North Wales; Dennis Patrick Stack, Warrington; Richard Shu-Hua Wu, Fort Washington, all of PA (US)

(73) Assignee: Rohm And Haas Company, Philadelphia, PA (US)

( * ) Notice: Subject to any disclaimer, the term of this patent is extended or adjusted under 35 U.S.C. 154(b) by 0 days.

(21) Appl. No.: 09/564,450

(22) Filed: May 3, 2000

Related U.S. Application Data

(60) Provisional application No. 60/135,307, filed on May 21, 1999.

(51) Int. Cl.[7] .................................................. C08F 2/16
(52) U.S. Cl. ......................................... 526/64; 526/200
(58) Field of Search .................................... 526/64, 200

(56) References Cited

U.S. PATENT DOCUMENTS

| | | | |
|---|---|---|---|
| 2,479,241 A | 8/1949 | Kolvoort et al. | |
| 3,296,168 A | 1/1967 | Jirik et al. | |
| 3,637,563 A | 1/1972 | Christena | |
| 4,355,142 A | 10/1982 | Khungar et al. | |
| 5,521,266 A | 5/1996 | Lau | |

FOREIGN PATENT DOCUMENTS

| | | |
|---|---|---|
| EP | 0 390 144 | 3/1990 |
| EP | 0577 281 A2 | 5/1994 |
| FR | 980530 | 5/1951 |

*Primary Examiner*—Christopher Henderson
(74) *Attorney, Agent, or Firm*—Ronald D. Bakule; Gary D. Greenblatt

(57) ABSTRACT

This invention relates to a process for preparing polymers which contain as polymerized units hydrophobic monomers wherein a stable emulsion is formed and the formation of suspension particles is minimized. The process includes making a concentrated monomer emulsion, diluting the concentrated monomer emulsion with water, feeding the diluted monomer emulsion to a reactor, and polymerizing the monomer.

8 Claims, No Drawings

PROCESS FOR PREPARING POLYMERS

This is a nonprovisional application of prior pending provisional application Ser. No. 60/135,307 filed May 21, 1999.

This invention relates to a process for preparing polymers. In particular, the invention relates to a process for preparing polymers which contain as polymerized units hydrophobic monomers. As used herein, by hydrophobic monomer is meant a monomer containing a $C_8$ to $C_{28}$ (meth)acrylic acid ester or a monomer with low water solubility such as styrene. By (meth)acrylic is meant both acrylic and methacrylic.

Polymers may be made by various processes, which include solution and emulsion polymerization. Many solution polymerization processes utilize organic solvents, whereas emulsion polymerization processes utilize water and surfactants. Due to environmental concerns over volatile organic compounds, emulsion polymerization processes are preferred.

Until recently, polymers which contain as polymerized units hydrophobic monomers were only known to be made through solution polymerization processes. This was because there are difficulties with emulsion polymerization processes. There are three problems associated with the emulsion polymerization of hydrophobic monomers. The first problem is that it is difficult to disperse the hydrophobic monomer in water and transport the monomer to the forming polymer. The second problem is in forming small enough monomer droplets to form a stable monomer emulsion. The third problem is that some suspension polymer, which has a larger particle size than emulsion polymer forms. The suspension polymer may cause problems such as forming a "cream" layer on top of the latex or a sedimentation layer upon storage. The suspension polymer may also cause problems in downstream application properties.

Therefore, there is a need for a process for preparing polymers which contain as polymerized units hydrophobic monomers, wherein a stable emulsion is formed and suspension polymer formation is minimized.

One emulsion polymerization approach to dispersing the hydrophobic monomer and transporting it to the forming polymer was taught in U.S. Pat. No. 5,521,266. The process disclosed in that patent generates a latex, and utilizes cyclodextrin to transport the monomer through the water phase to the polymer phase. The monomer and cyclodextrin were combined in an emulsion with a monomer concentration ranging from 69 weight percent to 77 weight percent. The monomer emulsion was not pre-diluted prior to feeding it to the reactor.

One problem associated with the approach of U.S. Pat. No. 5,521,266 is that some suspension particles are formed. Another problem associated with this approach is that upon dilution of the concentrated monomer emulsion with water, a highly viscous dispersion is formed. The high viscosity requires more energy to disperse the monomer emulsion in the reactor, and therefore more cost to agitate the dispersion during the polymerization. If higher agitation rates are used in the reactor, there is a potential for shear coagulation of the latex.

U.S. Pat. No. 3,637,563 disclosed a process for preparing polymers which may contain as polymerized units hydrophobic monomers. The process was designed to make higher solids containing polymer emulsions. The process includes premixing monomers, surfactant, and water in a tank to form a concentrated monomer emulsion, then feeding the concentrated monomer emulsion containing from 75 percent by weight to 94 percent by weight monomer to a reactor containing water and polymerizing the monomers. The process does not include a step of pre-diluting the concentrated monomer emulsion with water through a mixer prior to feeding the monomer emulsion to the reactor. Therefore, the process has the problem of forming a highly viscous dispersion upon dilution of the concentrated monomer emulsion with water.

U.S. Pat. No. 3,296,168 disclosed a continuous process for preparing polymers. The process utilizes an in-line mixer to create continuously a monomer emulsion from one monomer feed and a second feed of surfactant and water. A process for preparing polymers from concentrated monomer emulsions containing hydrophobic (meth)acrylic acid ester monomers was not disclosed.

U.S. Pat. No. 4,355,142 disclosed a process of preparing monomer emulsions for making polyvinyl chloride latexes. The process utilizes in-line rotating shearing means to prepare the monomer emulsion. The reference disclosed a drastic reduction in polymer build-up on the reactor interior and coagulum in the latex. The reference did not disclose the applicability of this process to hydrophobic monomers.

Despite the disclosure of the references, there is a continuing need for a process of preparing polymers containing as polymerized units hydrophobic monomers, wherein a stable emulsion is formed and suspension polymer formation is minimized.

The present invention provides a process including: preparing a concentrated monomer emulsion including at least one monomer; diluting the concentrated monomer emulsion with water; feeding the diluted monomer emulsion to a reactor; and polymerizing the monomer.

As indicated above, the first step in the process of the invention involves preparing a concentrated monomer emulsion. By concentrated is meant that the monomer emulsion contains from 76 percent by weight to 95 percent by weight, preferably from 80 percent by weight to 90 percent by weight of at least one monomer. The monomer is combined with water and emulsifiers or dispersing agents to form the concentrated monomer emulsion.

The concentrated monomer emulsion may be prepared by admixing the monomer, water, and emulsifiers or dispersing agents in a tank.

Alternatively, the concentrated monomer emulsion may be prepared through the use of in-line mixing. The in-line mixing process is characterized by separate feeds of monomer and a solution of water and emulsifiers or dispersing agents being fed continuously through an in-line mixer contained in the line and then to the reactor.

The preferred mixers are high shear mixers, such as, but not limited to an IKA multi-teeth high shear mixer (ULTA-TURRAX in line or the like), or Series 400 IN-LINE, X-Series Mixer Emulsifiers by Charles Ross & Son Company. This kind of mixer can produce high shear and energy density in a small space to emulsify the monomer in water.

The concentrated monomer emulsion may also be prepared by utilizing a high pressure homogenizer. A homogenizer is a device that pumps monomers, water, and surfactant through a valve at a high pressure. The pressure typically ranges from 1000 to 30000 psi. Suitable homogenizers include, but are not limited to those from EmulsiFlex such as the EmulsiFlex C-160 or the EmulsiFlex C-50.

The emulsifiers or dispersing agents employed for preparing the concentrated monomer emulsions may be anionic, cationic or non-ionic types. Also a mixture of any two types may be used. Suitable nonionic emulsifiers include, but are not limited to, ethoxylated octylphenols, ethoxylated nonylphenols, ethoxylated fatty alcohols and the like. Suitable anionic emulsifiers include, but are not limited to, sodium lauryl sulfate, sodium dodecylbenzene sulfonate, sulfated and ethoxylated derivatives of nonylphenols, octylphenols and fatty alcohols, esterified sulfosuccinates and the like. Suitable cationic emulsifiers include, but are not limited to, laurylpyridinium chlorides, cetyldimethyl amine acetate, ($C_8$–$C_{18}$) alkyldimethylbenzylammonium chlorides and the like. The level of emulsifier may be from about 0.1% to about 10% by weight, based on total monomer charged.

Among the monomers that may be useful in the concentrated monomer emulsion are ethylenically unsaturated monomers which include, but are not limited to (meth) acrylic ester monomers including methyl acrylate, ethyl acrylate, butyl acrylate, 2-ethylhexyl acrylate, decyl acrylate, methyl methacrylate, butyl methacrylate, hydroxyethyl methacrylate, and hydroxypropyl acrylate; acrylamide or substituted acrylamides; styrene or substituted styrene; vinyl acetate or other vinyl esters; vinyl monomers such as vinyl chloride, vinylidene chloride, N-vinyl pyrolidone; and acrylonitrile or methacrylonitrile. Butyl acrylate, methyl methacrylate, and styrene are preferred.

Ethylenically unsaturated acid containing monomers or salts thereof may also be useful. Suitable ethylenically unsaturated acid containing monomers include, but are not limited to acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride. Acrylic acid and methacrylic acid are preferred. Methacrylic acid is more preferred.

A fluorinated (meth)acrylate ethylenically unsaturated monomer, such as Zonyl™ products (Trademark of DuPont Chemical Company) may also be useful.

The at least one monomer may aslo be a silicone containing ethylenically unsaturated monomer, such as vinyl trimethoxy silane and methacryloxy propyl trimethoxy silane.

Monomers selected from $C_6$–$C_{20}$ alkyl styrene and alkyl-alpha-methyl styrene, $C_6$–$C_{20}$ alkyl dialkyl itaconate, $C_{10}$–$C_{20}$ vinyl esters of carboxylic acids, $C_8$–$C_{20}$ N-alkyl acrylamide and methacrylamide, $C_{10}$–$C_{20}$ alkyl alphahydroxymethylacrylate, $C_8$–$C_{20}$ dialkyl 2,2'-(oxydimethylene)diacrylate, $C_8$–$C_{20}$ dialkyl 2,2'-(alkyliminodimethylene)diacrylate, $C_8$–$C_{20}$ N-alkylacrylimide, and $C_{10}$–$C_{20}$ alkyl vinylether may also be useful.

Hydrophobic monomers such as $C_{12}$ to $C_{40}$ alkyl ester of (meth)acrylic acid may also be useful as the at least one monomer utilized in the process of this invention. Suitable alkyl esters of (meth)acrylic acid include, but are not limited to lauryl (meth)acrylate, cetyl (meth)acrylate, stearyl (meth)acrylate, behenyl (meth)acrylate, and eicosyl (meth) acrylate. In a preferred embodiment, the amount of the hydrophobic monomer ranges from 10 percent by weight to 99 percent by weight, preferably 20 percent by weight to 90 percent by weight, more preferably 30 percent by weight to 80 percent by weight.

Where hydrophobic monomers are included in the monomer emulsion, it is preferred to utilize from 0.1 percent by weight to 20 percent by weight, preferably from 0.2 percent by weight to 10 percent by weight, more preferably from 0.5 percent by weight to 2 percent by weight of a compound selected from cyclodextrin and cyclodextrin derivatives; cyclic oligosaccharides having a hydrophobic cavity such as cycloinulohexose, cycloinuloheptose, and cycloinuloctose; calyxarenes; and cavitands as phase transport catalysts to transfer the monomer droplets to the forming polymer.

The phase transport catalysts useful in the method of the invention are limited only by the solubility of the cyclodextrin and cyclodextrin derivative selected under the particular polymerization conditions. Suitable cyclodextrins useful in the method of the present invention include, but are not limited to, α-cyclodextrin, β-cyclodextrin and γ-cyclodextrin. Suitable cyclodextrin derivatives useful in the method of the present invention include, but are not limited to, the methyl, triacetyl hydroxypropyl and hydroxyethyl derivatives of α-cyclodextrin, β-cyclodextrin and γ-cyclodextrin. The preferred cylodextrin derivative is methyl-β-cyclodextrin.

The cyclic oligosaccharides having a hydrophobic cavity, such as cycloinulohexose, cycloinuloheptose, useful in the method of the invention are described by Takai et al., *Journal of Organic Chemistry*, 1994, volume 59, number 11, pages 2967–2975.

The calyxarenes useful in the method of the invention are described in U.S. Pat. No. 4,699,966, International Patent Publication WO 89/08092 and Japanese patent publications 1988/197544 and 1989/007837.

The cavitands useful in the method of the invention are described in Italian application 22522 A/89 and Moran et al., *Journal of the American Chemical Society*, volume 184, 1982, pages 5826–5828.

Non-cyclic polysaccharides, derivatives thereof, and degradation products thereof which are capable of forming inclusion compounds may also be useful as phase transport catalysts. Such materials may be useful at from 1 percent by weight to 20 percent by weight.

The phase transport catalysts may be admixed with water and emulsifiers or dispersants in the reactor prior to feeding the diluted monomer emulsion to the reactor. Alternatively, the phase transport catalysts may be admixed with the monomer or the concentrated monomer emulsion. The phase transport catalysts may be also be co-fed with water and emulsifiers or dispersants to the reactor while feeding the diluted monomer emulsion to the reactor.

A cross-linker selected from a cross-linking agent and a cross-linking monomer may also be incorporated into polymers made by the process of this invention. By cross-linker is meant a compound which has at least 2 reactive groups which will react with acid groups found on the monomers of the compositions of this invention. Cross-linking agents useful in polymers made by the process of this invention include a polyaziridine, polyisocyanate, polycarbodiimide, polyamine, and a polyvalent metal. The cross-linking agent is optional, and may be added after polymerization has been completed.

Cross-linking monomers are cross-linkers which are incorporated with other monomers. Cross-linking monomers which may be useful with polymers made by the process of this invention include acetoacetate-functional monomers such as acetoacetoxyethyl acrylate, acetoacetoxypropyl methacrylate, acetoacetoxyethyl methacrylate, allyl acetoacetate, acetoacetoxybutyl methacrylate, and 2,3-di (acetoacetoxy)propyl methacrylate; divinyl benzene, (meth) acryloyl polyesters of polyhydroxylated compounds, divinyl esters of polycarboxylic acids, diallyl esters of polycarboxylic acids, diallyl dimethyl ammonium chloride, triallyl terephthalate, methylene bis acrylamide, diallyl maleate, diallyl fumarate, hexamethylene bis maleamide, triallyl phosphate, trivinyl trimellitate, divinyl adipate, glyceryl trimethacrylate, diallyl succinate, divinyl ether, the divinyl ethers of ethylene glycol or diethylene glycol diacrylate, polyethylene glycol diacrylates or methacrylates, 1,6-hexanediol diacrylate, pentaerythritol triacrylate or tetraacrylate, neopentyl glycol diacrylate, cyclopentadiene diacrylate, the butylene glycol diacrylates or dimethacrylates, trimethylolpropane di- or tri-acrylates, (meth)acrylamide, n-methylol (meth)acrylamide, mixtures thereof, and the like. (Meth)acrylamide, n-methylol (meth)acrylamide, and mixtures thereof are preferred. The amount of cross-linker utilized is chosen such that the cross-linker does not interfere with film formation.

There are many advantages to using an in-line mixer to create a monomer emulsion. One advantage to using in-line mixers is that better mixing of additives may be achieved.

For example, chain transfer agents such as n-DDM normally are emulsified with monomers and water/surfactant in the monomer emulsion tank. However, n-DDM can initiate unwanted and dangerous polymerization in the monomer emulsion tank if impurities are present. Process additives such as chain transfer agents, polymerization inhibitors, and others can be continuously fed into the in-line mixer to insure good mixing before entering the reactor.

Normally low levels of process additives are used in emulsion polymerizations. Achieving good mixing of small amounts of additives directly into the large reactor can be difficult. If high agitation rates in the large reactor are used to mix the additives, it is not only costly but also has the potential to induce shear coagulation of the latex. In-line mixers have small mixing volumes and therefore mix well.

A second advantage to in-line mixing is that in-line mixers provide the ability to change monomers or other feed compositions continuously. With in-line mixing, the order of addition of water, emulsifier or dispersing agent, and monomer can change as called for by the process. The monomer and emulsifier or dispersing agent compositions can be changed by overlap or pulse feeds. By overlap feed, is meant two monomer emulsions with different types of monomers (or concentrations) and different surfactants (stream A and B) simultaneously fed into the reactor. The feed ratio of stream A to Stream B (Rf) may start at 0.5 and be changed to 200 or larger during the later stage of the feed.

By pulse feed, is meant one of the monomer concentrations is raised to a higher level in the monomer emulsion for a short period of time during the feed, then the concentration of this monomer returns to its normal concentration. It would be difficult to achieve this by having a monomer emulsion tank because, although the monomer concentration could easily be increased by adding monomer to the tank, the monomer concentration is difficult to reduce because this would require dilution. This process would be very costly with multiple monomer emulsion tanks. The process can be easily done with in-line mixing alone that is equipped with multiple monomer feed lines or with the combination of in-line mixing and a monomer emulsion tank.

During the emulsion polymerization, the monomer composition fed to the reactor can be continuously changed by feeding different amounts of monomer A and monomer B into the in line mixer at a given time. In this case, monomer A and monomer B, water, and emulsifier or dispersing agent are fed directly from their individual storage tanks into the in-line mixer. Therefore, it is possible to have the concentration of monomer in the monomer emulsion at 100% monomer A at the beginning of the feed, 50% monomer A and 50% monomer B at the midpoint of the feed, and 100% of monomer B at the end of the feed.

The ratio of monomer A to monomer B can be changed linearly or to any desirable profile to get any combination of desirable compositions. This kind of flexibility can only be easily achieved by in-line mixing.

The second step of the process of the invention is to dilute the concentrated monomer emulsion with water. The dilution must take place before feeding the concentrated monomer emulsion to the reactor. Generally, the amount of water added to the concentrated monomer emulsion is enough to dilute the amount of monomer in the emulsion to from 10 percent by weight to 80 percent by weight, preferably from 40 percent by weight to 80 percent by weight, more preferably from 60 percent by weight to 80 percent by weight.

We have found that the manner in which the dilution is performed is important. The concentrated monomer emulsion may be diluted with water in a tank equipped with stirring, by feeding the concentrated monomer and water through a tee, or through feeding the concentrated monomer emulsion and water to a static mixer. The diluted monomer emulsion may be fed to a storage tank and later fed to the reactor, or may be fed directly to the reactor. Generally, in-line mixing of water and the concentrated monomer emulsion is preferred. By in-line mixing is meant that materials are mixed in the line feeding the reactor. The in-line mixer may be a dynamic mixer or a static mixer. By dynamic mixer is meant a mixer with moving parts such as a small tank with an agitator. Other suitable dynamic mixers include, but are not limited to those devised by Ross or IKA described above.

Static mixers are preferred for this process. By static mixer is meant a mixer without moving parts. Suitable static mixers include, but are not limited to those from Sulzer Chemtech AG, such as the SMV type, the SMX type, and the SMXL type; and those from Chemineer including, the Kenics HEV mixer and the Kenics KMS mixer.

After the dilution of the concentrated monomer emulsion, the diluted monomer emulsion is fed to the reactor and reacted to form a polymer. The reactor may be a stirred tank reactor, a tubular reactor, a spiral heat exchanger, a plate and frame heat exchanger, or a plate and fin heat exchanger.

Monomer emulsions are typically fed to reactors with a pump. It is known in the art that the monomer emulsion can be fed into the reactor through a positive displacement pump such as a Waukesha pump. It is also known that a centrifugal pump can be used for these purposes.

The process of the invention may be useful for solution, suspension, or emulsion polymerizations. The process is particularly useful for emulsion polymerizations. Emulsion polymerizations are well known in the art and are described in U.S. Pat. No. 5,346,954, hereby incorporated by reference. Suitable initiators and process conditions can be found in the patent. The at least one monomer may be fed as a single monomer from the list above, or may be combinations thereof.

Chain transfer agents may be used to control the molecular weight of polymers made by the process of this invention. Suitable chain transfer agents include mercaptans, such as, for example, dodecylmercaptan ("n-DDM"). The chain transfer agent may be used at from 0.1% to 10% based on the total weight of the polymeric composition.

Throughout this specification and claims, unless otherwise indicated, references to percentages are by weight percent and all temperatures are in degree centigrade.

It is also to be understood that for purposes of this specification and claims that the range and ratio limits, recited herein, are combinable. For example, if ranges of 1–20 and 5–15 are recited for a particular parameter, it is understood that ranges of 1–15 or 5–20 are also contemplated.

The following abbreviations and Trademarks are used throughout this specification:

RPM=rotations per minute g=grams $Na_2CO_3$=sodium carbonate $Na_2S_2O_8$=sodium persulfate FeSO4=ferrous sulfate t-BHP=tertiary butyl hydroperoxide $cm^2$=square centimeters The following examples are intended to illustrate the process of the invention. The examples should not be construed as limiting the scope of the invention.

EXAMPLE 1

Lower Concentration of Monomer in the Emulsion

A monomer emulsion seed charge was prepared as follows: a 500 ml jar was equipped for magnetic stirring. To the jar was added 1.10 g of fatty alkyl ether sulfate, sodium salt, 139.0 g of water, 46.0 g of lauryl methacrylate, 45.0 g of methyl methacrylate, 10.0 g of butyl acrylate and 1.0 g of methacrylic acid. This charge was stirred vigorously throughout the addition time.

A monomer emulsion was prepared as follows: a 4 liter beaker was equipped for vigorous mechanical mixing using an overhead stir motor. A surfactant solution was made in the beaker using 495 g of water, 30.6 g of fatty alkyl ether sulfate, sodium salt and 133.0 g of polyethoxylated dodecyl alcohol. A 1900 g quantity of stearyl methacrylate was heated to 35° C. and then slowly added to the surfactant solution under vigorous mechanical mixing (350 RPM). The stearyl methacrylate was added slowly enough that the emulsion did not break, over approximately 5 minutes. Once the stearyl methacrylate addition was completed, 102.0 g of methyl methacrylate and 41.0 g of methacrylic acid were added. Stirring continued throughout the addition.

The polymer was prepared as follows: a 5 liter 4 neck flask was equipped with a mechanical stirrer, a condenser, and three feed lines. The flask was charged with 525 g of water and heated to 87° C. When the temperature had stabilized, the following were added: 31.2 g of fatty alkyl ether sulfate, sodium salt, 41.00 g of a 51% methyl-β-cyclodextrin solution, a buffer solution (7.20 g $Na_2CO_3$/40.00 g water), and a initiator solution (7.20 g $Na_2S_2O_8$/35.00 g water). After the addition of these charges the monomer emulsion seed was fed through an inline emulsifier (set to 3500 RPM) to the reaction over 20 minutes. When the seed addition was complete, a kettle additive consisting of 41.00 g of a 51% methyl-β-cyclodextrin solution and 30.00 g of water was added to the flask. The monomer emulsion was then fed through an in-line high shear mixer (set to 3500 RPM) to the flask over a three-hour period while maintaining a temperature of 79–81° C. Separate feeds of catalyst (1.10 g of $Na_2S_2O_8$ in 110.00 g of water) and water (500 g) were added to the flask over 3 hours. When the monomer emulsion addition was complete, residual monomer was reacted by adding, in succession, solutions of 0.02 g FeSO4/5.00g water, 4.00 g 70% t-BHP/35.00 g water, and 2.07 g isoascorbic acid/50.0 g water. The emulsion was then neutralized by adding a solution of 9.5 g aqueous ammonia in 10.0 g water.

EXAMPLE 2

Higher Concentration of Monomer in the Emulsion

A monomer emulsion seed charge was prepared as follows: a 500 ml jar was equipped for magnetic stirring. To the jar was added 1.10 g of fatty alkyl ether sulfate, sodium salt, 139.0 g of water, 46.0 g of lauryl methacrylate, 45.0 g of methyl methacrylate, 10.0 g of butyl acrylate and 1.0 g of methacrylic acid. This charge was stirred vigorously throughout the addition time.

A monomer emulsion was prepared as follows: a 4-liter beaker was equipped for vigorous mechanical mixing using an overhead stir motor. A surfactant solution was made in the beaker using 180 g of water, 30.6 g of fatty alkyl ether sulfate, sodium salt and 133.0 g of polyethoxylated dodecyl alcohol. A 1900 g quantity of stearyl methacrylate was heated to 35° C. and then slowly added to the surfactant solution under vigorous mechanical mixing (350 RPM). The stearyl methacrylate was added slowly enough that the emulsion did not break, over approximately 5 minutes. Once the stearyl methacrylate addition was complete, 102.0 g of methyl methacrylate and 41.0 g of methacrylic acid were added. Stirring continued throughout the addition.

The polymer was prepared as follows: a 5 liter 4 neck flask was equipped with a mechanical stirrer, a condenser, and two feed lines. The flask was charged with 840 g of water and heated to 87° C. When the temperature had stabilized, the following were added: 31.2 g of fatty alkyl ether sulfate, sodium salt, 41.0 g of a 51% methyl-β-cyclodextrin solution, a buffer solution (7.20 g $Na_2CO_3$/40.0 g water), and an initiator solution (7.20 g $Na_2S_2O_8$/35.0 g water). After the addition of these charges the monomer emulsion seed was fed through an in-line emulsifier (set to 3500 RPM) to the reaction over 20 minutes. When the seed addition was complete, a kettle additive consisting of 41.0 g of a 51% methyl-β-cyclodextrin solution and 30.0 g of water was added to the flask. The monomer emulsion was then fed through an in-line high shear mixer (set to 3500 RPM) to the flask over a three hour period while maintaining a temperature of 79–81° C. Separate feeds of catalyst (1.10 g of $Na_2S_2O_8$ in 110.00 g of water) and water (500 g) were added to the flask over 3 hours. When the monomer emulsion addition was complete, residual monomer was reacted by adding, in succession, solutions of 0.02 g FeSO4/5.00 g water, 4.00 g 70% t-BHP/35.0 g water, and 2.07 g isoascorbic acid/50.0 g water. The emulsion was then neutralized by adding to it a solution of 9.5 g aqueous ammonia in 10.0 g water.

EXAMPLE 3

High Concentration of Monomer in the Emulsion, which Is then Pre-Diluted with Water A monomer emulsion seed charge was prepared as follows: a 500 ml jar was equipped for magnetic stirring. To the jar was added 0.10 g of fatty alkyl ether sulfate, sodium salt, 139.0 g of water, 46.0 g of lauryl methacrylate, 45.0 g of methyl methacrylate, 10.0 g of butyl acrylate and 1.0 g of methacrylic acid. This charge was stirred vigorously throughout the addition time.

A monomer emulsion was prepared as follows: an aqueous surfactant solution was made using 180 g of water, 30.6 g of fatty alkyl ether sulfate, sodium salt and 133.0 g of polyethoxylated dodecyl alcohol. A separate solution was made in a 4 liter beaker by taking 1900 g of stearyl methacrylate that had been heated to 35° C. and adding 102.0 g of methyl methacrylate and 41.0 g of methacrylic acid. When polymerization began, these two solutions were simultaneously fed through the in-line emulsifier over a period of 3 hours.

The polymer was prepared as follows: a 5 liter 4 neck flask was equipped with a mechanical stirrer, a condenser, and two feed lines. The flask was charged with 525 g of water and heated to 87° C. When the temperature had stabilized, the following were added: 31.2 g of fatty alkyl ether sulfate, sodium salt, 41.0 g of a 51% methyl-β-cyclodextrin solution, a buffer solution (7.20 g $Na_2CO_3$/40.0 g water), and an initiator solution (7.20 g $Na_2S_2O_8$/35.0 g water). After the addition of these charges the monomer emulsion seed was fed through an in-line emulsifier (set to 3500 RPM) to the reaction over 20 minutes. When the seed addition was complete, a kettle additive consisting of 41.0 g of a 51% methyl-β-cyclodextrin solution and 30.0 g of water was added to the flask. The concentrated monomer emulsion was prepared by passing the aqueous feed above and the monomer feed above through an in-line emulsifier (set to 3500 RPM). The concentrated monomer emulsion was then passed through a static mixer where it was continuously mixed over a 3 hour period with a water feed (465 g) to form the diluted monomer emulsion, which was fed to the flask. The additions were done while maintaining a temperature of 79–81° C. A separate feed of catalyst (1.10 g of $Na_2S_2O_8$ in 465 g of water) was simultaneously added to the flask over 3 hrs. When the monomer emulsion addition was complete, residual monomer was reacted by adding, in succession, solutions of 0.02 g FeSO4/5.00 g water, 4.00 g 70% t-BHP/35.0 g water, and 2.07 g isoascorbic acid/50.0 g water. The emulsion was then neutralized by adding to it a solution of 9.5 g aqueous ammonia in 10.0 g water.

Results

The polymers prepared above were analyzed for suspension particle formation. Using micrographs taken of the latex, a count was taken of the number of large suspension particles (defined as particles having a diameter larger than 2.0 microns). The results are shown in Table 1.

TABLE 1

| Example | Large Suspension particles | Particles/cm$^2$ |
|---|---|---|
| 1 | 10 | 0.10 |
| 2 | 14 | 0.14 |
| 3 | 2 | 0.02 |

Visual inspection of the photographs also showed a significant reduction in the number of intermediate sized suspension particles (defined herein as particles with diameters ranging from 0.5 to 2.0 microns).

We claim:

1. A process comprising:
    preparing a concentrated monomer emulsion comprising at least one hydrophobic monomer selected from the group consisting of $C_{12}$ to $C_{40}$ alkyl esters of (meth) acrylic acid, styrene, and α methyl styrene;
    diluting the concentrated monomer emulsion with water in an in-line mixer selected fron the group consisting of a dynamic mixer and a static mixer;
    feeding the diluted monomer emulsion to a reactor; and
    polymerizing the monomer in the presence of a compound selected from the group consisting of cyclodextrin, cyclodextrin derivatives, cyclic oligosaccharides having a hydrophobic cavity, calyxarenes, and cavitands.

2. The process according to claim 1 wherein the in-line mixer is a static mixer.

3. The process according to claim 2 wherein the reactor is selected from the group consisting of a stirred tank reactor, a tubular reactor, a spiral heat exchanger, a plate and frame heat exchanger, and a plate and fin heat exchanger.

4. The process according to claim 3 wherein the reactor is a stirred tank reactor.

5. The process according to claim 1 wherein the concentrated monomer emulsion comprises from 76 percent by weight to 95 percent by weight of monomer.

6. The process according to claim 1 wherein the concentrated monomer emulsion comprises from 80 percent by weight to 90 percent by weight of monomer.

7. The process according to claim 6 wherein the concentrated monomer emulsion is diluted with water such that the amount of the monomer in the diluted emulsion ranges from 40 percent by weight to 80 percent by weight.

8. The process according to claim 7 wherein the concentrated monomer emulsion is diluted with water such that the amount of the monomer in the diluted emulsion ranges from 60 percent by weight to 80 percent by weight.

* * * * *